United States Patent
Ziklik et al.

(10) Patent No.: US 11,061,973 B2
(45) Date of Patent: Jul. 13, 2021

(54) INCORPORATING USER USAGE OF CONSUMABLE CONTENT INTO RECOMMENDATIONS

(71) Applicant: Microsoft Technology Licensing, LLC, Redmond, WA (US)

(72) Inventors: Elad Ziklik, Modi'in (IL); Royi Ronen, Tel Aviv (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 765 days.

(21) Appl. No.: 13/918,898

(22) Filed: Jun. 14, 2013

(65) Prior Publication Data

US 2014/0372429 A1    Dec. 18, 2014

(51) Int. Cl.
*G06F 16/9535* (2019.01)
*G06F 16/335* (2019.01)
*G06Q 30/02* (2012.01)

(52) U.S. Cl.
CPC ........ *G06F 16/9535* (2019.01); *G06F 16/337* (2019.01); *G06Q 30/0282* (2013.01)

(58) Field of Classification Search
CPC ......... G06F 17/30699; G06F 17/30867; G06F 17/30702; G06F 16/9535; G06F 16/337; G06Q 30/0282
USPC ........................................................ 707/736
See application file for complete search history.

(56) References Cited

U.S. PATENT DOCUMENTS

| | | | |
|---|---|---|---|
| 6,947,922 B1 | 9/2005 | Glance | |
| 7,200,801 B2 * | 4/2007 | Agassi et al. | 715/202 |
| 7,590,562 B2 | 9/2009 | Stoppelman | |
| 7,685,074 B2 | 3/2010 | Linden et al. | |
| 7,966,325 B2 | 6/2011 | Singh | |
| 8,136,034 B2 * | 3/2012 | Stanton | G06F 17/30613 715/200 |
| 8,150,858 B2 | 4/2012 | Perronnin et al. | |
| 8,510,247 B1 * | 8/2013 | Kane, Jr. | G06N 5/02 706/46 |
| 8,930,204 B1 * | 1/2015 | Igoe | G06F 17/30699 705/2 |
| 2003/0093329 A1 | 5/2003 | Gutta | |
| 2007/0282785 A1 * | 12/2007 | Fayyad et al. | 707/1 |

(Continued)

FOREIGN PATENT DOCUMENTS

CN         1625901 A      6/2005

OTHER PUBLICATIONS

"Office Action Issued in Korean Patent Application No. 10-2015-7035291", dated Sep. 28, 2020, 11 Pages.

(Continued)

*Primary Examiner* — Hosain T Alam
*Assistant Examiner* — Saba Ahmed
(74) *Attorney, Agent, or Firm* — Fiala & Weaver P.L.L.C.

(57) ABSTRACT

Disclosed herein is a system and method for generating a user profile for a user based on the way the user interacts with consumable content in an application, such as an electronic book in an e-reader. The actions of the user with regards to the content are monitored and the associated with characteristics of the content. This association is used to build the user's profile of their likes and dislikes which are then provided to a recommender system to provide more relevant and personalize recommendations.

20 Claims, 6 Drawing Sheets

(56) References Cited

U.S. PATENT DOCUMENTS

| | | | | |
|---|---|---|---|---|
| 2009/0222430 | A1* | 9/2009 | Hobson | G06F 17/30035 |
| 2010/0057743 | A1* | 3/2010 | Pierce | G06F 17/30699 |
| | | | | 707/E17.134 |
| 2010/0293058 | A1* | 11/2010 | Maher | G06F 17/30699 |
| | | | | 705/14.66 |
| 2011/0163977 | A1* | 7/2011 | Barnhoefer | G06F 1/3287 |
| | | | | 345/173 |
| 2011/0320276 | A1 | 12/2011 | Ray et al. | |
| 2012/0150888 | A1* | 6/2012 | Hyatt | G06F 17/30528 |
| | | | | 707/758 |
| 2013/0007609 | A1 | 1/2013 | Bak et al. | |
| 2013/0080471 | A1 | 3/2013 | Forte et al. | |
| 2013/0204833 | A1* | 8/2013 | Pang | G06Q 30/02 |
| | | | | 706/52 |
| 2014/0372430 | A1* | 12/2014 | Sitruk | G06F 17/30702 |
| | | | | 707/736 |
| 2015/0326688 | A1* | 11/2015 | Aarnio | G06F 17/30029 |
| | | | | 707/748 |

OTHER PUBLICATIONS

"First Office Action and Search Report Issued in Chinese Patent Application No. 201480033102.1", dated Mar. 27, 2017, 16 Pages.

Bellotti, et al., "Activity-Based Serendipitous Recommendations with the Magitti Mobile Leisure Guide", In Proceedings of the SIGCHI Conference on Human Factors in Computing Systems, Apr. 5, 2008, 10 pages.

Good, et al., "Combining Collaborative Filtering with Personal Agents for Better Recommendations", In Proceedings of the Sixteenth National Conference on Artificial Intelligence and the Eleventh Innovative Applications of Artificial Intelligence Conference Innovative Applications of Artificial Intelligence, Jul. 1999, 8 pages.

"International Search Report and Written Opinion Issued in PCT Application No. PCT/US2014/041813", dated Jun. 8, 2015, 7 Pages.

"Summon to Attend Oral Proceedings Issued in European Patent Application No. 14736549.8", Mailed Date: Apr. 2, 2020, 9 Pages.

"Office Action issued in Indian Patent Application No. 7596/CHENP/2015", dated Jun. 3, 2020, 9 Pages.

"Office Action Issued in European Patent Application No. 14736549.8", dated Jul. 15, 2019, 8 Pages.

"Second Office Action Issued in Chinese Patent Application No. 201480033102.1", dated Dec. 13, 2017, 7 Pages.

"Supplementary Search Report Issued in European Application No. 14736549.8", dated Nov. 21, 2016, 6 Pages.

* cited by examiner

INCORPORATING USER USAGE OF CONSUMABLE CONTENT INTO RECOMMENDATIONS

TECHNICAL FIELD

This description relates generally to using actual user behavior and usage of consumable content into a recommendation system such that recommendations are more personalized for the user.

BACKGROUND

Marketplaces have historically provided users with a list of recommended items that the user may be interested in. However, these recommendations have historically been based off of the relationships between items. Typically this has been in the form of "people who have bought this have also bought these items". More advanced systems of recommendations look at the items themselves to determine if the items are related and the user may be interested in the items based on a similarity between the item being looked at and these items.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present example provides a system and method for presenting recommendations to users based on the user's actual consumption of content as opposed to general and generic recommendations based on the items alone. The system monitors the user's actions as they consume content displayed on a device. Based on this monitoring a profile is generated for the user that indicates how the user consumes various types of content and determines what content the user enjoys and what content is less interesting to the user. The user's profile is then personalized and shared with the recommendation system such that the recommendation system identifies content that is more likely to be of interest to the user and removes content that is less likely to be of interest to the user.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
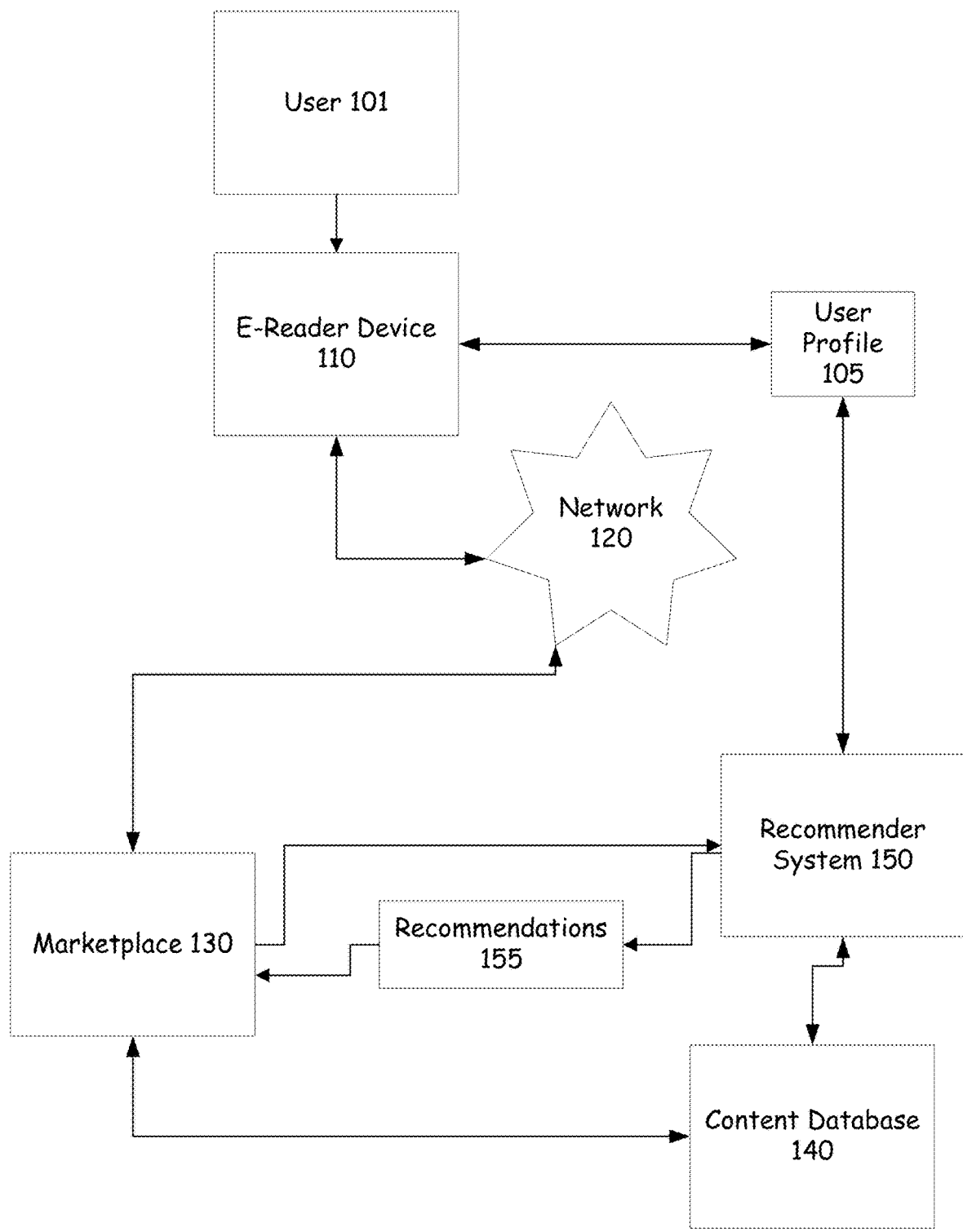
FIG. 1 is a block diagram of a recommendation system 100 for recommending content to a user based on an analysis of the user's interactions with content according to one illustrative embodiment.

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be for example, but not limited to, an electronic, magnetic, optical, electromagnetic, infrared, or semiconductor system, apparatus, device, or propagation medium. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and may be accessed by an instruction execution system. Note that the computer-usable or computer-readable medium can be paper or other suitable medium upon which the program is printed, as the program can be electronically captured via, for instance, optical scanning of the paper or other suitable medium, then compiled, interpreted, of otherwise processed in a suitable manner, if necessary, and then stored in a computer memory.

Communication media typically embodies computer-readable instructions, data structures, program modules or other data in a modulated data signal such as a carrier wave or other transport mechanism and includes any information delivery media. This is distinct from computer storage media. The term "modulated data signal" can be defined as a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above-mentioned should also be included within the scope of computer-readable media.

When the subject matter is embodied in the general context of computer-executable instructions, the embodiment may comprise program modules, executed by one or more systems, computers, or other devices. Generally, program modules include routines, programs, objects, components, data structures, and the like, that perform particular tasks or implement particular abstract data types. Typically, the functionality of the program modules may be combined or distributed as desired in various embodiments.

Recommendation systems and recommender systems that are used by many merchants to encourage people to purchase items that they may be interested in are typically based on the information collected from a multitude of purchasers. When a potential customer uses the merchant's storefront the customer is presented with a list of recommended items. Typically, the user is presented with the items along with a phrase such as "Customers who bought X also bought Y" where X is the item the customer is currently looking at and Y is the recommended item or items. Some merchants maintain a profile for their customers and make recommendations based on the customer's previous purchases from the marketplace. These recommendations require the customer to create a profile with the merchant. However, one of the weaknesses of these systems is that the merchant only knows what the customer has previously purchased and what others who have purchased that item have also purchased. The merchant doesn't know whether the customer actually liked the item or even if the customer consumed the item.

FIG. 1 is a block diagram of a recommendation system 100 for recommending content to a user based on an analysis of the user's interactions with content. Recommendation system 100 includes a user 101, an e-reader device 110, a network connection 120, a marketplace 130, a recommender system 150 and a content database 140. These components and their interaction with one another are briefly discussed with respect to FIG. 1.

E-reader device 110 is any device which has the capability of providing the user 101 with consumable content such as an electronic book, video, or music. In one embodiment the e-reader device 110 is a standalone device, such as a Kindle or Nook. In alternative embodiments e-reader device 110 is presented as an application on a computing device such as a personal computer, a tablet computer, a mobile phone or a gaming system. The user of the e-reader device 110 views or consumes content on the device. As the user 101 views the content a log of the actions the user takes are captured by a monitoring application on e-reader device 110. From this log of actions a personalized profile 105 for the user of the device is determined. This personalized profile can include features such as what type of books the user likes, what type of material the user enjoys reading from within the book, the reading or grade level of the user, or the times or situations in which the user reads certain content (e.g. different content is read while commuting, traveling, vacationing, working, before going to sleep, etc). However, any information that may be gathered or obtained from the way the user consumes the content or interacts with the e-reader device 110 may be captured and used in generating the user's personal profile.

When the user wishes to obtain additional content to view on the e-reader device 110 the user 101 connects with a marketplace 130 to find additional content. Once connected to the marketplace 130 through network 120, the user 101 searches for content that they are interested in. The marketplace 130 provides the user 101 with results of content that the user is looking for. Additionally, the marketplace 130 provides the user 101 with a list of items that the user may be interested in also purchasing or consuming. In order to provide more relevant recommendations to the user 101, the user's personalized profile is provided to the recommender system 150. The recommender system 150 takes the user's personalized profile and searches through the content database 140 to identify content in the database 140 that matches the user's profile. For example the recommender system 150 may search the content database 140 for books that have a specific scene type in them, or books that are appropriate for the time of day the user 101 is searching the marketplace 130. Once a predetermined number of results are found by the recommender system 150 in the content database 140, the recommender system 150 will provide back to the marketplace 130 the results to be provided to the user as recommendations 155.

Figure 2:
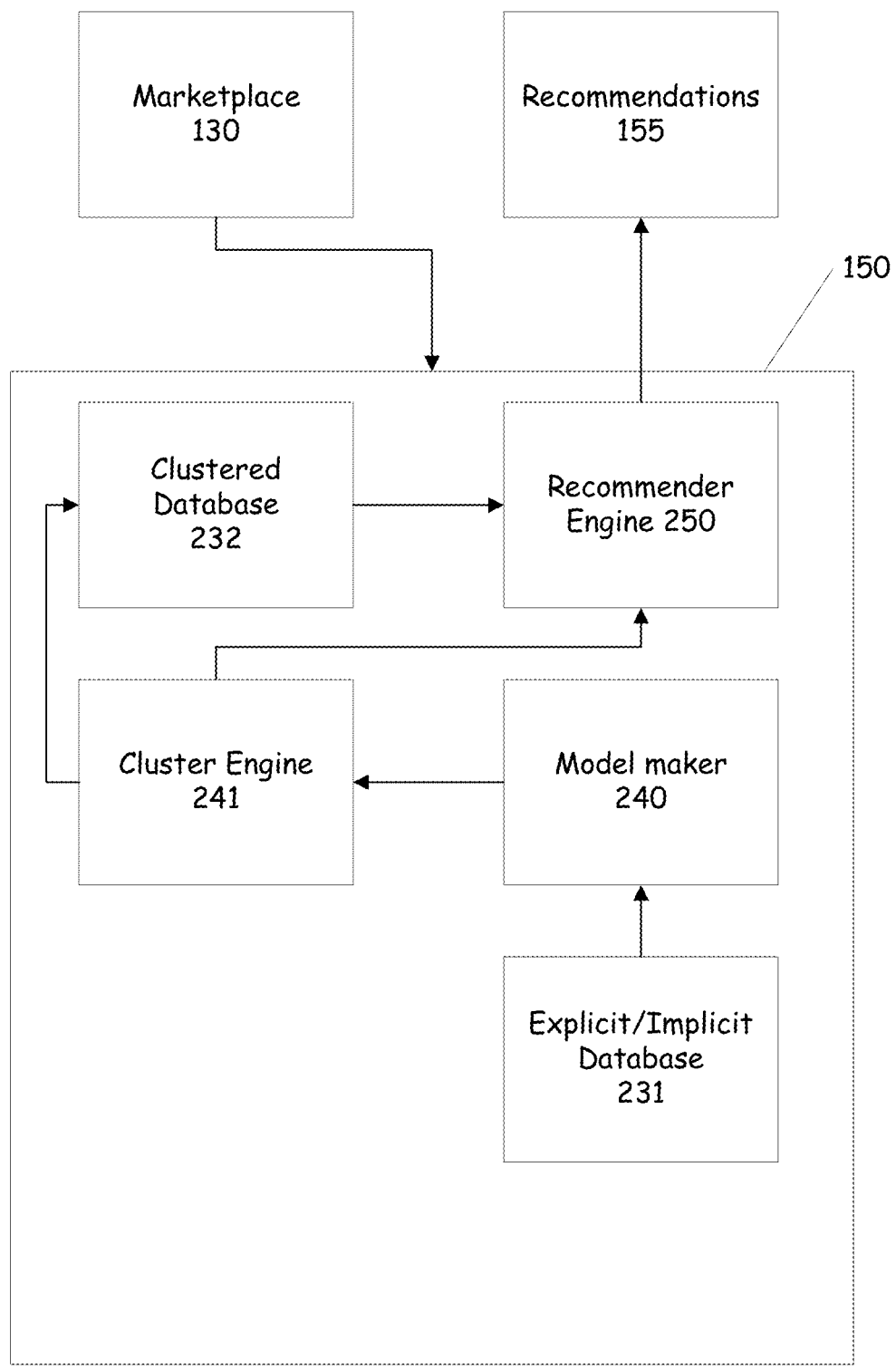
FIG. 2 is a block diagram illustrating an example recommender system according to one illustrative embodiment.

FIG. 2 schematically shows a recommender system 150 operating to provide recommendations to users such as user 101 in FIG. 1 above, that may access the recommender system through the marketplace 130 using the e-reader device 110 according to one illustrative embodiment. However, any available recommender system may be used. Recommender system 150 in some embodiments comprises an "explicit-implicit database" 231 comprising explicit and/or implicit data acquired responsive to preferences exhibited by a population of users 101 for items in a catalog of items. Recommender system 150 may comprise a model maker 240 and a cluster engine 241 that cooperate to cluster related catalog items in catalog clusters and generate a clustered database 232. A recommender engine 250 recommends catalog items from catalog clusters in clustered database 232.

Explicit data optionally comprised in explicit-implicit database 231 includes information acquired by recommender system 150 responsive to explicit requests for information submitted to users 101 in the population. These requests can be obtained in one embodiment from the user 101 when the user generates their personal profile with the marketplace or first interacts with the e-reader device 110. Explicit requests for information may comprise, for example, questions in a questionnaire, requests to rank a book or movie for its entertainment value, requests to express an opinion on quality of a product, or requests to provide information related to likes and dislikes. Implicit data in the explicit-implicit database 231 can includes data acquired by the recommender system 150 responsive to observations of behavior of users 101 in the population that is not consciously generated by an explicit request for information. For example, implicit data may comprise data responsive to determining how the user uses content displayed by the e-reader device 110.

Model maker 240 processes explicit and/or implicit data comprised in explicit-implicit database 231 to implement a model for representing catalog items that represents each of the catalog items by a representation usable to cluster the catalog items. Cluster engine 241 processes the representations of the catalog items provided by model maker 240 to generate "clustered database" 232 in which the plurality of catalog items is clustered into catalog clusters, each of which groups a different set of related catalog items. While FIG. 2 schematically shows explicit-implicit database 231 as separate from clustered database 232, clustered database 232 may be comprised in explicit-implicit database 231. To generate clustered database 232, cluster engine 241 may for example simply mark records in explicit-implicit database 231 to indicate clusters with which the records are associated.

Any of various models for providing representations of catalog items and methods of processing the representations to cluster the catalog items and generate clustered database 232 may be used in practice of an embodiment of the invention. Model maker 240 may for example generate representations of catalog items that are based on feature vectors. Optionally, model maker 240 represents catalog items by vectors in a space spanned by eigenvectors, which are determined from a singular value decomposition (SVD) of a "ranking matrix" representing preferences of users 101 for the catalog items. Model maker 240 may represent catalog items by trait vectors in a latent space determined by matrix factorization of a ranking matrix. However, other methods may be employed.

Cluster engine 241 optionally clusters catalog items in a same catalog cluster if same users exhibit similar preferences for the catalog items. Optionally, cluster engine 241 uses a classifier, such as a support vector machine, trained on a subset of the catalog items to distinguish catalog items and cluster catalog items into catalog clusters. In an embodiment of the invention, cluster engine 241 uses an iterative k-means clustering algorithm to cluster vectors representing catalog items and generate clustered database 232.

Figure 3:
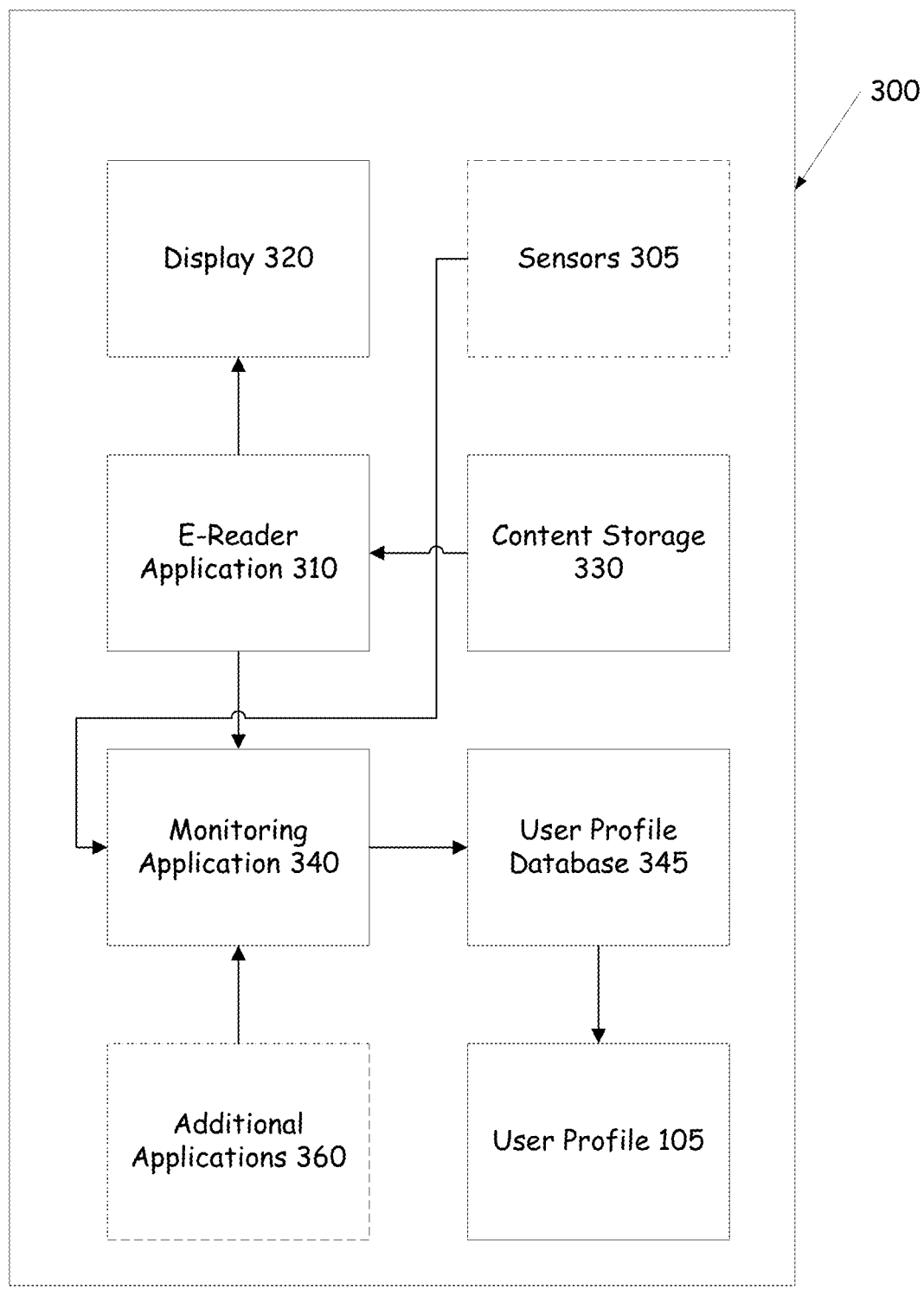
FIG. 3 is a block diagram illustrating the components of an e-reader device according to one illustrative embodiment.

FIG. 3 is a block diagram illustrating the components of an e-reader device 300, such as device 110 in FIG. 1 according to one illustrative embodiment. As mentioned earlier, while the present description discusses an e-reader device, those skilled in the art will readily recognize that device 300 can be any device having an e-reader application 310 such as a personal computer, tablet computer, mobile phone, etc. E-reader device 300 includes an e-reader application 310, a display 320, content storage 330, monitoring application 340, a user profile database 345, and optionally additional applications 360.

E-reader application 310 is an application that is configured to provide consumable content to a user through the display 320. E-reader application 310 can be in one embodiment an e-reader application 310 such as Amazon Kindle, Barnes and Noble Nook, etc. The e-reader application 310 in some embodiments can be an application that is downloaded or otherwise installed on-top of an already existing operating system such as the Windows operating system by Microsoft Corporation, the Android operating system, or iOS by Apple. In this embodiment the user is able to navigate between the e-reader application 310 and the additional applications 360. When the e-reader device 300 is a stand-alone device the ability to navigate outside the e-reader application 310 may be limited or not available at all.

The user 101 can download or otherwise store content, such as books, movies or music, on the e-reader device 300. This content is stored in content storage 330. In one embodiment content storage 330 is a solid state memory device such as flash storage. However, any type of device that is capable of storing the content may be used. The user 101 accesses the content in content storage 330 through the e-reader application 310. In some embodiments content storage 330 is a cloud storage facility where the content is accessed by the e-reader application 310 over a network connection.

In some embodiments the e-reader device 300 includes a number of sensors 305. Sensors 305 may be any type of sensor or device that can provide additional information about the way the e-reader device is being used. Sensors 305 can include global position system receiver, gyroscopes, sensors that can determine the position, angle or orientation of the e-reader device, microphones, light sensors, etc. The information from these sensors may be provided to the monitoring application 340 as part of the process of generating and updating the user's personalized profile.

Monitoring application 340 is an application operating on the device 300 that is configured to gather information related to the activities of a user when the user is using the e-reader application 310. In some embodiments the monitoring application 340 is a component of the e-reader application 310. The monitoring application 340 receives inputs from the e-reader application 310 that allow the monitoring application 340 to know what content the user is currently consuming on the e-reader application 310. This information or set of characteristics can include the title, genre, chapter, page of the content that is being consumed, the subject matter (e.g. gory, erotic, romantic) of the current page being consumed, etc. However, in other embodiments additional data about the content can be provided to the monitoring application 340. Each time the user changes the content displayed by the e-reader application 310 the monitoring application 340 receives an indication of this change. The monitoring application 340 then adds this information to the profile for the user that is maintained in the user profile database 345. This information can include data related to how long the user remained on the page, whether user went forward or back a page, skipped a chapter in the content, scrolled a page, changed magnification of the page (zoomed in and/or out) etc.

The monitoring application 340 in some embodiments receives signals from sensors that are part of the device 300. Sensors can include a gyroscopic sensors, light sensors, position sensors, Global Position System sensors, etc. These sensors provide the monitoring application 340 with information related to how the device is currently being used. For example, if the user is using the device in bed, the sensors may provide data indicative of low light or that the device is being held a specific angle. In another example the GPS data may indicate that the user is at work or a hotel when they are consuming the content on the device 300. This data is merged with the data that received from the e-reader application 310 such that data may later be correlated to learn more about how the user specifically uses the e-reader.

In some embodiments the monitoring application 340 is configured to receive input from the additional applications. These additional applications can include applications such as an internet browser, a calendar application, word processor, etc. When the user switches away from the e-reader application 310 the monitoring application 340 receives an indication that the user has navigated away from the e-reader application 310. This indication can either be sent from the e-reader application 310, the operating system underlying the device 300, or from the application that the user has navigated to and is currently using. The monitoring application 340 can then determine how the user is using the other application. In one embodiment the monitoring application 340 determines if the activity on the other application is related to the content that was previously being consumed by the user on the e-reader application 310. If the monitoring application 340 determines that the content is related the monitoring application 340 can add this information to the information that is associated with the user. For example, if the user navigated to the internet browser and then went to dictionary page, the monitoring application 340 could determine or make a note that the user needed to look-up a word that was on that particular page. If the user continues to go between the e-reader application 310 and the dictionary the monitoring application 340 could determine that the content in the e-reader application 310 is at a more difficult level than the user is comfortable. In another example, the user could navigate to, for example, Wikipedia and then search for information related to the content displayed in the e-reader application 310. The monitoring application 340 can use this information to determine that the user has a greater interest in the content.

The monitoring application 340 generates a profile for the user based on the information that is received from the e-reader application 310. This information allows the monitoring application 340 understand how the user consumes the content by associating different features of the content consumed. The profile is stored in the user profile database 345. In generating the profile for the user the way the user consumed the content is considered. By looking at each piece of content the user has consumed and the way the user has consumed that content the monitoring application 340 is able to determine specific things about the user and content the user is interested in. For example, if the user keeps returning to content that is related to gory murders, then the monitoring application 340 would determine that the user is interested in content that is gory. If the user consumes content related to gory murders during the daytime hours, but consumes romantic content at night, the monitoring application 340 would determine that the user prefers harder content during the day and softer content at night. If the user consumes content that requires them to repeatedly go to a dictionary the monitoring application 340 could determine that the content is too difficult for the user. In yet another example if the sensors detect that the device has tilted from the normal reading position and the user has not changed the page in the content, the monitoring application 340 may determine that the user has fallen asleep and therefore the content is not something that is stimulating to the user. In some embodiments the monitoring application 340 can pass this raw data to the recommender system 150 to perform the user profile generation.

Based on the way the user consumes the content and the decisions made by the monitoring application 340 in the building of the user's profile a personalized profile of the user can be built. This profile can be shared with the recommender system 150 so that when the user interacts with a marketplace 130 that uses the recommender system 150 much more relevant and personalize recommendations can be made to the user. Thus, the profile for a user that is stored in the user profile database may indicate that the user likes content related to gory murders for daytime reading, romantic content for evening reading and finds historical content to be boring. Again, in some embodiments the user's personalized profile 105 is stored or maintained at the recommender system 150.

Figure 4:
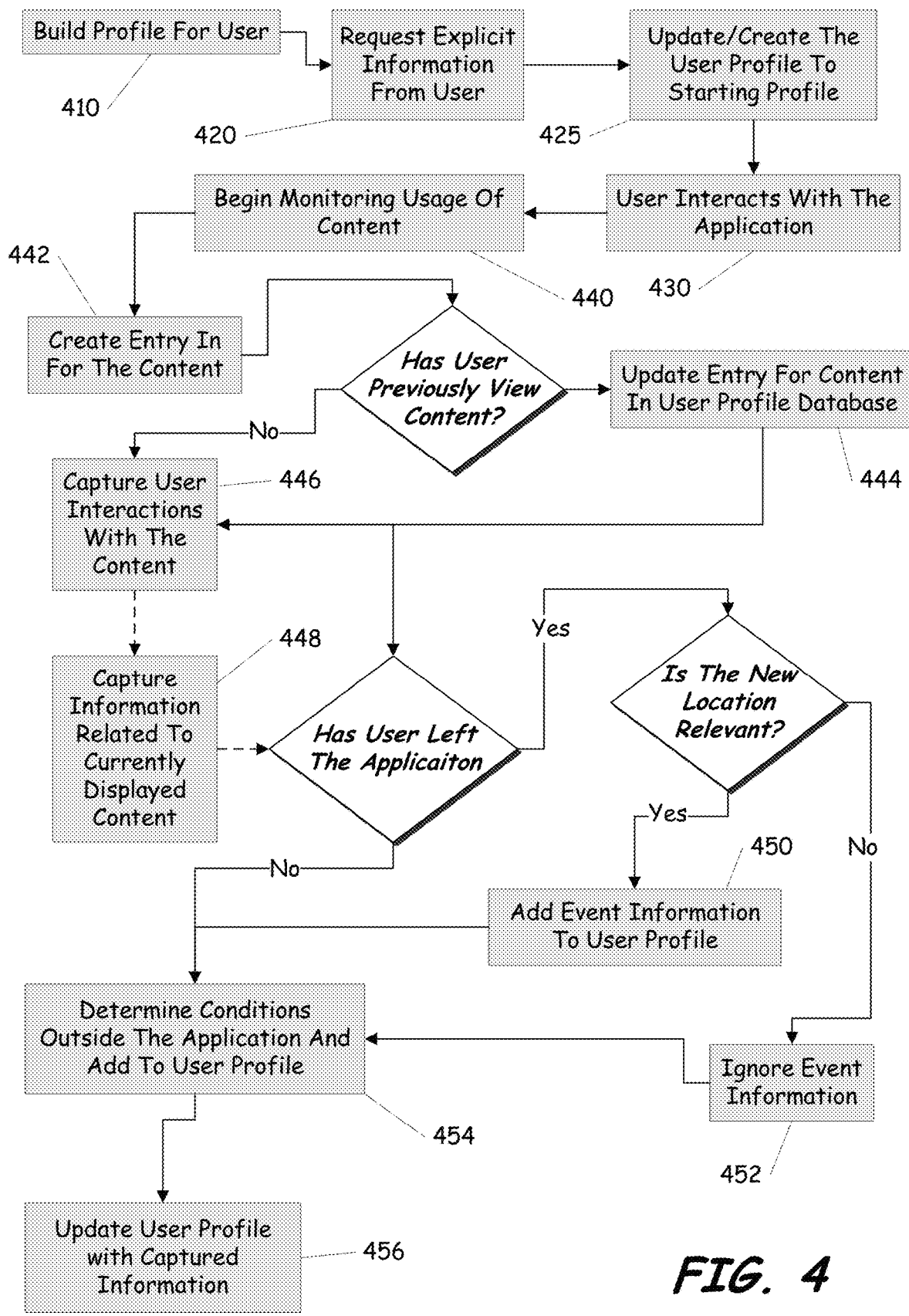
FIG. 4 is a flow diagram illustrating the process executed by the present system for building and updating a personalized profile for a user of an e-reader device according to one illustrative embodiment.

FIG. 4 is a flow diagram illustrating the process executed by the present system for building and updating a personalized profile for a user of an e-reader device. The process begins by building a profile for the user of the e-reader. This is illustrated at step 410. The profile building process can take a number of different forms. In one embodiment, the profile is built by using information already available from the device. This information may be associated with an account that the user has used to login to the device. In an alternative embodiment the user's profile may be obtained from another source, such as a Facebook, Windows Live, Google, Amazon profile, or any other location where a user's profile may be accessed or maintained. In some embodiments, multiple profiles may be combined to form a single initial profile for the user. By combining profiles it may be possible to learn more about the user than from a single profile. The user's profile 105 is in one embodiment an association of various pieces of information such as about how, when, and types of content the user consumes. Each of these pieces of information can be combined with each other to form a picture (profile) of what the user likes or dislikes based on their consumption habits.

In some embodiments, the profile generation process may include having the user fill out a survey or series of questions. This explicit request for information is illustrated at step 420. These questions may be presented to the user on the display of the e-reader device. These questions may in some embodiments be designed to elicit responses from the user such that the system can better build the user's profile. In other embodiments these questions can be used to generate a profile for the user from scratch. This can occur for instance when the user does not wish to or cannot share their other profiles with the system or the user does not have any other profile. This modification of the user profile to a starting user profile is illustrated at step 425.

The user then proceeds to use the e-reader application 310 in a normal manner. That is the user purchases books, movies, games or other content from the marketplace 130 associated with a provider or providers of content to the e-reader, and views or consumes the purchased content. As mentioned previously the term purchased can mean content that is paid for, or content that is provided free of charge to the e-reader device. This is illustrated at step 430.

As the user uses the content in the e-reader, the monitoring application 340 monitors the actual use of the e-reader as well as other system components and applications. The monitoring process is illustrated by steps 440-456.

The monitoring process begins when the user first opens up the content through the e-reader. This is illustrated by step 440. At this point the monitoring application 340 creates an entry in the storage for the content and records the specific content that is opened. This information may include the title, author, purchase date, publication date, genre, or any other information that is available about the content either in data or metadata. This information is then stored in onboard storage or the user profile database 245. This is illustrated at step 442.

The monitoring application 340 in one embodiment does not create the entry in the onboard storage at the time the content is purchased. By waiting until the content is opened the monitoring application 340 is not burdened with entries that are irrelevant or meaningless. This can occur because the user for example, inadvertently purchased the content, the content was automatically added to the e-reader, or the user simply added the content and then forgot about it, etc. Further, by waiting until the user has opened the content more accurate data regarding the content and the user's use of the content can be gathered. However, in other embodiments the entry in the storage can be created at the time the content is purchased.

If the user is reopening content that has already been added to the system, the monitoring application 340 locates in the storage the entry for the particular content. The monitoring application 340 can then make additional entries into the record for the content, such as calculating how long it has been since the user last viewed the content item. This is illustrated at step 444.

The user continues to interact with the content displayed on the e-reader. The user may read a page, turn a page, go back a page, skip a page, skip a chapter, or perform another of other activities associated with viewing the content. Each of these activities the user performs is captured by the monitoring application 340. This is illustrated at step 446.

The monitoring application 340, in some embodiments, also captures other information about the specific page. For example, the monitoring application 340 may capture the amount of time the user spent on each page, the number of times the user has returned to that particular page, the specific portion of the page that has is being viewed. In some embodiments the content of the specific page that is being view is known. This can include, for example, the subject matter of the specific chapter/page (e.g. a sex scene, a romantic scene, a violent scene, an action scene, etc.), or a grade level of the content (e.g. harder to read or easier to read). In embodiments where the e-reader has the ability to track eye movement the monitoring application 340 may record various pieces of information related to the movement of the eye, such as tracking that the user is rereading a particular sentence multiple times or is reading the words very fast. The monitoring application 340 stores this information in the record for the content. This is illustrated at step 448.

While the user is viewing the content in the e-reader, the user may access another application that is available through the device. For example, the user may use an internet browser to view content on the web. The monitoring application 340 recognizes that the user has left the e-reader application 310 and has moved to the other application. The monitoring application 340 determines the reason the user has left the e-reader application 310. For example, the user may have left the e-reader application 310 to view an online dictionary related to a word that was in the e-reader that the user did not know the meaning of, or may have navigated to a web page having content related to the information currently displayed on the page. Conversely, the user may have navigated to a web page that has nothing related to the content displayed in the e-reader. The monitoring application 340 determines whether the leaving of the e-reader application 310 is an event that should be recorded with the entry in the storage or if the event is an unrelated event to the content. If the event is determined to relevant to the content, then the event is stored in the associated entry for the event. This is illustrated at step 450. If the content is determined to be irrelevant the event is disregarded. This is illustrated at step 452. However, in some embodiments the profile may be updated to indicate that the user has left the e-reader application. When the user returns to the e-reader application the process can return to step 444 in the process.

The monitoring application 340 in some embodiments is capable of determining when and how the user is using the content in the e-reader. For example, when the e-reader has a light sensor the monitoring application 340 can determine that the user is viewing the content in a low-light situation or a bright light situation. The monitoring application 340 can use an onboard clock to determine the time the user views the content, such as during work times, lunch time, bed time etc. In other embodiments, the monitoring application 340 can access the user's calendar to associate the time with a specific event. For example the monitoring application 340 could determine from the calendar application that the user is traveling, in a meeting, or on a vacation. In yet other embodiments, the monitoring application 340 can determine the actual location of the user. For example the monitoring application 340 can determine the user is currently on a train or an airplane. This external information is also added to the entry for the content in the user's profile. This is illustrated at step 454. The profile is updated with the information gathered during this iteration at step 456. The organization of the data in the profile and the specifics of the updating can be determined based on the way the particular recommender system 150 processes the profile in making recommendations. As such any particular format of the data in the profile can be equally applicable.

This process of monitoring the user's usage of the content is repeated each time the user views content (either different content or the same content) on the e-reader. Through this process the monitoring application 340 is able to build a personalized profile for the user based on the way the user actually uses and consumes content on the e-reader device. The process of building the profile associates each of the pieces of information that is collected during the monitoring and creates relationships between the data such that recommender system can process the information to make better recommendations. The monitoring application 340 provides the user's data that has been collected to the recommender system 150 so that when the user requests content from the recommender system 150 the user's personalized profile is available to provide enhanced and more relevant recommendations.

Figure 5:
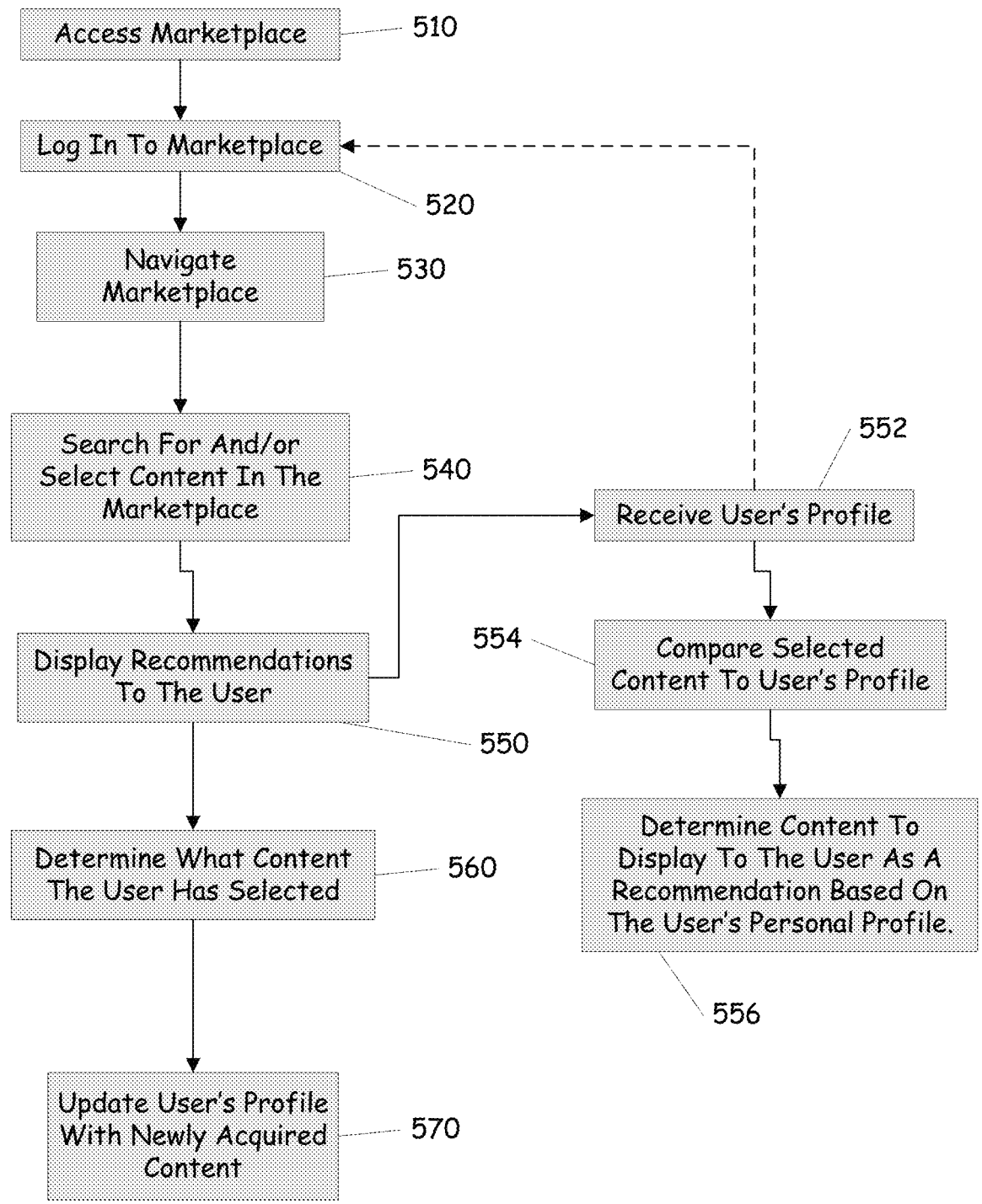
FIG. 5 is a flow diagram illustrating the process of providing a recommendation to the user according to one illustrative embodiment.

FIG. 5 is a flow diagram illustrating the process of providing a recommendation to the user according to one illustrative embodiment. The process begins when the user access a marketplace 130 or online catalog of content associated with the e-reader application 310. This is illustrated at step 510.

The user logs in to or otherwise identifies themself to the marketplace 130. This is illustrated at step 520. Once the user is logged into the marketplace 130 their profile is obtained from either the marketplace's 130 own database or is provided to the marketplace 130 from the monitoring application 340. This is illustrated at step 525. The user then navigates through and searches for content that they desire to purchase or view on their e-reader. This navigation occurs according the layout and design of the marketplace 130 and the user does not recognize that the navigation is different from the normal navigation. This is illustrated at step 530.

When the user selects a particular item from the search results the user is able review the description provided by the marketplace 130 about the displayed content. The user can also proceed to buy the content through the merchant's portal. This is illustrated at step 540. In conjunction with displaying the description of the content a number of recommendations are also provided to the user. This is similar to the presentation of "People who have bought this have also bought this" that is often presented along with typical recommendations. However, in contrast to these recommendations the presented recommendations have been customized for the user based on the information provided by the monitoring application 340. This is illustrated at step 550.

To generate these personalized recommendations the recommender system 150 takes the data from the user profile database that was captured for the user and applies at least content based filtering to the data with the content contained in the merchant's content database. This is illustrated at step 552.

The recommender system 150 takes the currently selected item that the user is looking at and compares the metadata associated with the item with the data from the user profile database. The recommender system 150 analyzes the user's data to identify key features in the data that will allow the recommender system 150 to make more relevant recommendations. This includes for example, comparing the genre or features of the selected content with genres or features the user has shown previous interest in. Also the recommender system 150 takes into consideration other data points that are available such as the current time or the user's location. This is illustrated at step 554.

Based on the information in the user's profile and the data related to the content at the marketplace 130 the recommender system 150 causes a number of recommendations to be displayed to the user. These recommendations are based not on what others have purchased but on the user's personalized profile. For example the recommender system 150 knowing that the user likes content related to gory murders may cause a book that has a gory murder scene to be displayed as a recommendation while not displaying a book that has a regular murder even though both books are commonly purchased by the same customers when not using the present personalized system. Further, the recommender system 150 may recommend books or content that is unrelated to the currently selected content as it has determined that the user's preferred content is not related to the presently selected content. This is illustrated at step 556.

The user may then purchase or navigate to the recommended content or conversely purchase the already selected content. This is illustrated at step 560. Once the user makes the selection or navigation the information related to this navigation is added to the user's personal profile. If the profile is maintained or stored at the recommender system 150 it is updated there. If it is maintained by the monitoring application 340, then the information is passed back to the monitoring application 340 so that the profile may be updated with the new information. This is illustrated at step 570.

Figure 6:
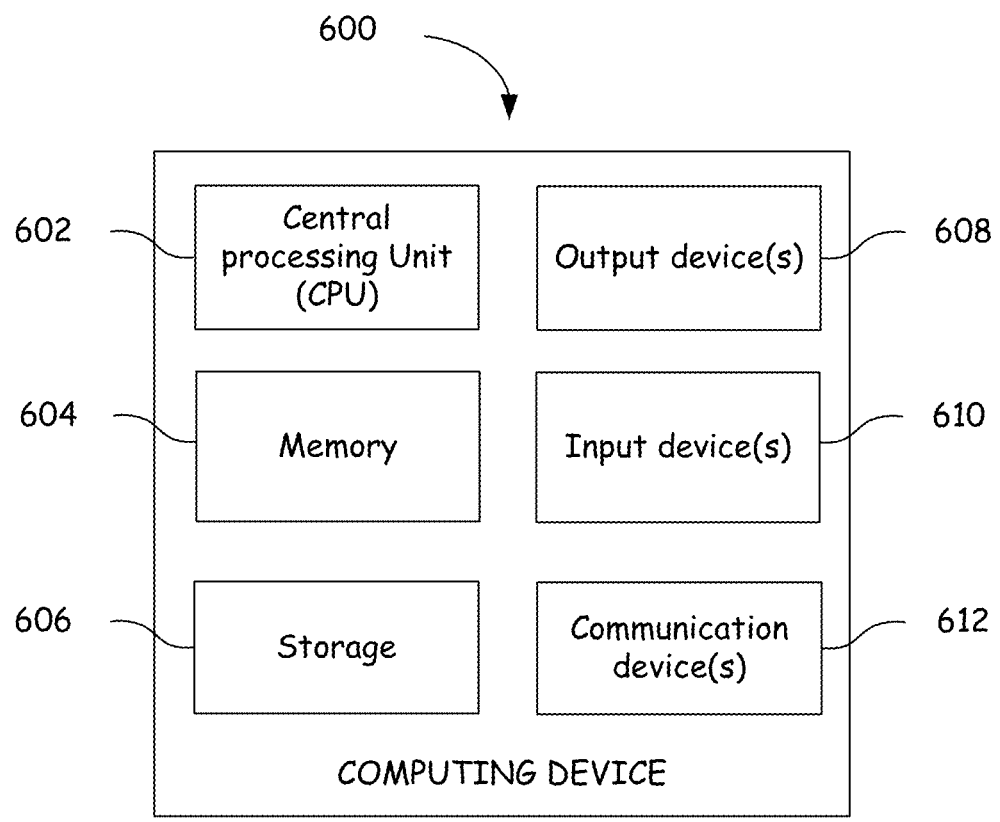
FIG. 6 is a block diagram illustrating a computing device which can implement the recommendation and monitoring system according to one embodiment.

FIG. 6 illustrates a component diagram of a computing device according to one embodiment. The computing device 600 can be utilized to implement one or more computing devices, computer processes, or software modules described herein. In one example, the computing device 600 can be utilized to process calculations, execute instructions, receive and transmit digital signals. In another example, the computing device 600 can be utilized to process calculations, execute instructions, receive and transmit digital signals, receive and transmit search queries, and hypertext, compile computer code, as required by the system of the present embodiments. Further, computing device 600 can be a distributed computing device where components of computing device 600 are located on different computing devices that are connected to each other through network or other forms of connections. Additionally, computing device 600 can be a cloud based computing device.

The computing device 600 can be any general or special purpose computer now known or to become known capable of performing the steps and/or performing the functions described herein, either in software, hardware, firmware, or a combination thereof.

In its most basic configuration, computing device 600 typically includes at least one central processing unit (CPU) 602 and memory 604. Depending on the exact configuration and type of computing device, memory 604 may be volatile (such as RAM), non-volatile (such as ROM, flash memory, etc.) or some combination of the two. Additionally, computing device 600 may also have additional features/functionality. For example, computing device 600 may include multiple CPU's. The described methods may be executed in any manner by any processing unit in computing device 600. For example, the described process may be executed by both multiple CPU's in parallel.

Computing device 600 may also include additional storage (removable and/or non-removable) including, but not limited to, magnetic or optical disks or tape. Such additional storage is illustrated in FIG. 5 by storage 606. Computer storage media includes volatile and nonvolatile, removable and non-removable media implemented in any method or technology for storage of information such as computer readable instructions, data structures, program modules or other data. Memory 604 and storage 606 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 600. Any such computer storage media may be part of computing device 600.

Computing device 600 may also contain communications device(s) 612 that allow the device to communicate with other devices. Communications device(s) 612 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer-readable media as used herein includes both computer storage media and communication media. The described methods may be encoded in any computer-readable media in any form, such as data, computer-executable instructions, and the like.

Computing device 600 may also have input device(s) 610 such as keyboard, mouse, pen, voice input device, touch input device, etc. Output device(s) 608 such as a display, speakers, printer, etc. may also be included. All these devices are well known in the art and need not be discussed at length.

Those skilled in the art will realize that storage devices utilized to store program instructions can be distributed across a network. For example a remote computer may store an example of the process described as software. A local or terminal computer may access the remote computer and download a part or all of the software to run the program. Alternatively the local computer may download pieces of the software as needed, or distributively process by executing some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The invention claimed is:

1. A method for generating a profile for a user in a recommender system comprising:
 detecting that the user has opened an electronic book in an e-reader application on a device;
 determining a set of characteristics for a portion of the electronic book viewed by the user in the e-reader application;
 automatically identifying, via a monitoring application on the device, actions performed by the user on the portion of the electronic book through the e-reader application, the actions including:
  navigating within the electronic book or changing a magnification of a page;
  leaving the e-reader application; and
  performing an action outside of the e-reader application;
 determining a reason the user left the e-reader application based on the action performed outside of the e-reader application; and
 updating the profile for the user based on the way the user views the portion of the electronic book as indicated by the automatically identified actions, the determined reason the user left the e-reader application, and the set of characteristics.

2. The method of claim 1 wherein determining a set of characteristics for the portion of the electronic book further comprises:
 determining a subject matter for at least the portion of the electronic book.

3. The method of claim 1 further comprising:
 receiving an indication from the device of a condition outside of the e-reader application; and
 updating the profile for the user based on the received indication of the condition.

4. The method of claim 1 further comprising:
 determining that the user has accessed a different application on the device;
 identifying content on the different application;
 determining if the content on the different application is related to the portion of the electronic book; and
 updating the profile for the user when the content of the different application is determined to be related to the portion of the electronic book.

5. The method of claim 1 further comprising:
 receiving information external from the e-reader application; and
 updating the profile for the user with the external information.

6. The method of claim 5 further comprising associating the external information with the set of characteristics for the portion of the electronic book.

7. The method of claim 1 wherein the identified actions comprise at least one of:
 turning a page;
 returning to a previously viewed page;
 skipping a chapter; or
 scrolling the page.

8. The method of claim 1 further comprising:
 determining that the user has opened a second electronic book in the e-reader application;
 determining a second set of characteristics for a portion of the second electronic book;
 identifying an action performed by the user on the portion of the second electronic book through the e-reader application; and
 updating the profile for the user based on the identified action performed by the user on the portion of the second electronic book through the e-reader application and the set of characteristics for the portion of the second electronic book.

9. The method of claim 1 further comprising:
 providing the profile to a recommender system to generate a list of recommendations.

10. The method of claim 1 wherein the profile comprises an entry for each of the identified actions for the portion of the electronic book.

11. The method of claim 10 further comprising:
 identifying a second action performed by the user on the portion of the electronic book;
 determining a time between the identified actions and the second action; and
 updating the profile with the determined time between the identified actions and the second action.

12. A device comprising:
 at least one processor;
 a memory configured to store one or more electronic books;
 an e-reader application configured to provide the user with an electronic book of the one or more electronic books;
 a monitoring application configured to:
  determine a set of characteristics for a portion of the electronic book viewed by the user in the e-reader application; and
  automatically monitor actions of the user related to a portion of the electronic book viewed by the user in the e-reader application, the automatically monitored actions including at least one of navigating within the electronic book or changing a magnification of a page; and
 a user profile database including at least one personalized profile for the user and configured be updated by the monitoring application with information related to how the user views the portion of the electronic book as indicated by the automatically monitored actions and a time of day associated with the determined set of characteristics.

13. The device of claim 12 wherein the monitoring application is further configured to:
 identify a subject matter for at least the portion of the electronic book; and
 associate an automatically monitored action with the subject matter.

14. The device of claim 12 further comprising:
 at least one sensor, the at least one sensor configured to detect at least one condition external to the e-reader application; and
 wherein the monitoring application is configured to associate the at least one condition with the portion of the electronic book.

15. The device of claim 12 further comprising:
 a second application separate from the application; and
 wherein the monitoring application is configured to determine that the user has accessed the second application, to determine content in the second application and to determine if the content in the second application is related to the portion of the electronic book.

16. The device of claim 12 wherein the device is an e-reader device.

17. A system for providing recommendations to a user comprising:
- a device having an e-reader application configured to present an electronic book to the user;
- a monitoring application configured to automatically monitor actions performed by the user with respect to a portion of the electronic book through the e-reader application and to associate the monitored action with a set of characteristics for the portion of the electronic book, the automatically monitored actions including at least one of navigating within the electronic book or changing a magnification of a page;
- a user profile including personalized user profile information related to how the user views the portion of the electronic book as indicated by the automatically monitored actions;
- a marketplace configured to provide the user with additional consumable content; and
- a recommender system configured to receive the user profile and to analyze the user profile to determine additional consumable content to recommend to the user based on the personalized user profile and vectors representing the additional consumable content.

18. The system of claim 17 wherein the device is an e-reader device.

19. The method of claim 1, wherein said determining a reason the user left the e-reader application based on the action performed outside of the e-reader application comprises:
- determining the user has navigated to a page comprising at least one of a word or content displayed on the e-reader application.

20. The device of claim 12, wherein the determined set of characteristics comprises a genre or scene of the portion of the electronic book.

* * * * *